US 9,240,733 B2

(12) United States Patent
Royak et al.

(10) Patent No.: US 9,240,733 B2
(45) Date of Patent: Jan. 19, 2016

(54) HIGH DYNAMIC CONTROL APPARATUS FOR CURRENT SOURCE CONVERTER

(71) Applicants: Semyon Royak, Orange Village, OH (US); Manish Pande, Cambridge (CA); Jingya Dai, Kitchener (CA); Sang Woo Nam, Cambridge (CA); Ehshan Al-Nabi, Cambridge (CA)

(72) Inventors: Semyon Royak, Orange Village, OH (US); Manish Pande, Cambridge (CA); Jingya Dai, Kitchener (CA); Sang Woo Nam, Cambridge (CA); Ehshan Al-Nabi, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 239 days.

(21) Appl. No.: 14/042,756

(22) Filed: Oct. 1, 2013

(65) Prior Publication Data

US 2015/0091484 A1   Apr. 2, 2015

(51) Int. Cl.
| | |
|---|---|
| H02P 6/14 | (2006.01) |
| H02P 3/00 | (2006.01) |
| H02P 3/14 | (2006.01) |
| H02P 3/22 | (2006.01) |
| H02M 5/458 | (2006.01) |
| H02M 7/162 | (2006.01) |
| H02P 21/00 | (2006.01) |
| H02P 21/06 | (2006.01) |

(52) U.S. Cl.
CPC .......... *H02M 5/4585* (2013.01); *H02M 7/1626* (2013.01); *H02P 21/0035* (2013.01); *H02P 21/06* (2013.01)

(58) Field of Classification Search
CPC .............. H02P 6/08; H02P 6/001; H02P 6/14

USPC .............................. 318/400.26, 375, 376, 380
See application file for complete search history.

(56) References Cited

U.S. PATENT DOCUMENTS

| | | | |
|---|---|---|---|
| 6,269,010 B1 | 7/2001 | Ma et al. | |
| 7,495,410 B2* | 2/2009 | Zargari et al. | 318/729 |
| 9,054,589 B2* | 6/2015 | Cheng et al. | 361/88 |
| 2006/0232250 A1 | 10/2006 | Sihler et al. | |
| 2010/0080028 A1* | 4/2010 | Cheng et al. | 363/126 |
| 2011/0057588 A1* | 3/2011 | Rineh et al. | 318/380 |

OTHER PUBLICATIONS

Wu, Bin, "High-Power Converters and AC Drives", IEEE Press, Wiley-Interscience, A. John Wiley & Sons, Inc., Publication, 2006, pp. 307-309.
Espinoza, Jose R., "A Current-Source-Inverter-Fed Induction Motor Drive System with Reduced Losses", IEEE Transactions on Industry Applications, vol. 43, No. 4, Jul./Aug. 1998, pp. 796-805.

(Continued)

*Primary Examiner* — Eduardo Colon Santana
*Assistant Examiner* — Gabriel Agared
(74) *Attorney, Agent, or Firm* — Fay Sharpe LLP (57) ABSTRACT

Current source converters and control methods are presented for high dynamic performance by implementing a DC link current control loop parallel to one or more motor control loops, with a DC link current control command value for operating the current source rectifier being derived at least partially independent of the motor control command values, wherein certain implementations drive the current source rectifier to its maximum rated value, or the DC current command value can be set above an amount required by the current source inverter using a gain factor which can be fixed or can itself be adjusted based on one or more motor control error values for balancing as-needed dynamic performance and efficiency.

14 Claims, 6 Drawing Sheets

(56) References Cited

OTHER PUBLICATIONS

European Search Report, EP Appl. No. 14187279.6-1806/2858233; mailed Oct. 13, 2015; completed Oct. 2, 2015; Examiner Wenyan Zeng; 8 pgs.

Nonanka et al., "Quick Regulation of Sinusoidal Output Current in PWM Converter-Inverter System", Conf. Record of the Industry Applications Society Annual Meeting (IAS), San Diego, CA, Oct. 1-5, 1989; 7 pgs.

Saner et al, "Analysis and Simplified Representation of a Current Source Inverter Induction Motor Drive", IEEE Transactions on Industrial Electronic and Control Instrumentation, IEEE, NY, NY, vol. IECI-27, No. 4, Nov. 1, 1980, 7 pgs.

* cited by examiner

HIGH DYNAMIC CONTROL APPARATUS FOR CURRENT SOURCE CONVERTER

BACKGROUND

Power conversion systems convert input electrical power from one form to another for driving a load. Current source converter (CSC) type drives typically include a current source rectifier (CSR) to selectively switch AC input power to create a DC link current that is fed to a current source inverter (CSI) to provide single or multi-phase AC output current for driving a motor load at a controlled speed and/or applications torque. Current source converters are often used for medium voltage applications (e.g., 2.3-13.8 kV) and provide certain advantages such as stability and direct output current control. However, certain applications require thyristors or other current source rectifier switches capable of withstanding high switching voltages, and the switching losses associated with the CSR switches generally increase with switching frequency. For medium voltage drives, a typical CSR switching frequency is about 500 Hz. In addition, current source converters often employ large DC link chokes having relatively long time constants. Accordingly, the dynamic performance of the current source rectifier is typically limited to about 200 Hz or less. In motor drive applications, moreover, the switching operation of the rectifier and current source inverter often employ multiple control loops, including a control loop for regulating the DC link current, as well as one or more motor control loops for regulating motor speed, torque, rotor flux, etc. Conventional multi-loop control approaches provide an inner DC link current control loop, with one or more outer loops for controlling the motor operating parameters. However, motor drive applications are increasingly requiring faster dynamic response to load changes, and/or speed or torque setpoint step changes, and the dynamic response of multiple-loop nested control architectures is limited by the dynamic limitations of the inner DC link current control loop. Accordingly, a need remains for improved current source converters and control techniques to provide higher dynamic operation in current source converters.

SUMMARY

One or more aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

The present disclosure provides a novel approach to current source converter control by operating the current source regulator at least partially independent of the other motor control loops to facilitate enhanced dynamic performance of the overall motor drive. In certain embodiments, the DC current control loop is completely independent, with the current source regulator operating according to a fixed command signal or value, such as a maximum rated current. In other embodiments, the DC current control loop is operated according to a command signal or value computed according to the inverter current command magnitude and a gain factor greater than unity to provide a margin that facilitates high dynamic operation of the current source inverter to adapt to load transients and motor control loop setpoint changes, without significant efficiency loss. The gain factor may be user-adjustable and/or maybe be automatically adjusted based on one or more motor control loop error signals. By these techniques, the dynamic performance of current source converters can be improved, and a trade-off can be made between the converter efficiency and the amount of dynamic enhancement. As a result, field oriented control approaches can be implemented using a DC current loop in addition to inverter current and/or voltage loops, as well as speed, torque and flux loops with enhanced upward carrier frequency adaptability to avoid or mitigate dynamic limitations associated with the DC current control by providing a parallel DC current control loop.

A motor drive is provided in accordance with one or more aspects of the present disclosure, having a current source rectifier, a current source inverter, an intermediate DC circuit, and a controller which implements one or more motor control loops to control operation of a motor load by providing inverter switching control signals. The controller implements a DC current control loop in parallel with the motor control loop(s) to provide the rectifier switching control signals for converting AC input power to regulate the DC current provided to the intermediate DC circuit according to at least one DC current command signal or value derived at least partially independent of the motor command signal(s) or value(s).

In certain embodiments, the controller implements the DC current loop independent from the motor control loop or loops by providing the rectifier control signals according to a constant DC current command, such as a maximum rated DC current of the current source rectifier, and the controller may allow a user to adjust the current command in certain implementations. In various embodiments, moreover, the controller provides pulse width modulated switching control signals to the inverter according to at least one inverter current command signal or value from the at least one motor control loop using a modulation index computed according to the magnitude of the at least one inverter current command signal or value scaled by a value of the rectifier DC current.

In certain embodiments, the CSC converter controller provides rectifier control signals based on a DC current command signal or value computed as a product of a magnitude of one or more inverter current command signals or values from the motor control loop(s) and a gain value, where the gain value is greater than 1.0, such as about 1.1-1.5 in certain implementations. The controller, moreover, may be programmed to allow a user to adjust the gain value in certain embodiments. In some embodiments, the controller automatically adjusts the gain value according to one or more motor control loop error signals or values, such as speed error, torque error, flux error, etc., by selectively increasing the gain for increasing motor control loop error and vice versa. In this manner, the extra margin provided by the non-unity gain factor is increased on an as-needed basis to facilitate high dynamic response, and as the motor control approaches the desired operational conditions, the gain is decreased in order to avoid excessive efficiency penalties.

Certain implementations of the controller operate the current source rectifier with a maximum rated DC current command signal or value for a predetermined time upon and after power up of the motor drive, and thereafter with the DC current command signal or value computed as a product of the magnitude of the inverter current command signal or value and a gain value, wherein the gain value greater than 1.0. In this manner, the controller can accommodate potentially high torque demands upon motor drive startup, and thereafter control the rectifier according to the non-unity gain for improved efficiency and subsequent as-needed high dynamic performance.

Further aspects of the present disclosure provide a method for current source converter control, which includes implementing one or more load control loops by providing current source inverter switching control signals according to at least one load command signal or value, computing a DC current command signal or value at least partially independent of the at least one load command signal or value, and implementing a DC current control loop parallel to the load control loop(s) by providing rectifier switching control signals according to the DC current command signal or value.

In accordance with further aspects of the present disclosure, non-transitory computer readable mediums are provided with computer executable instructions for performing the motor drive control methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
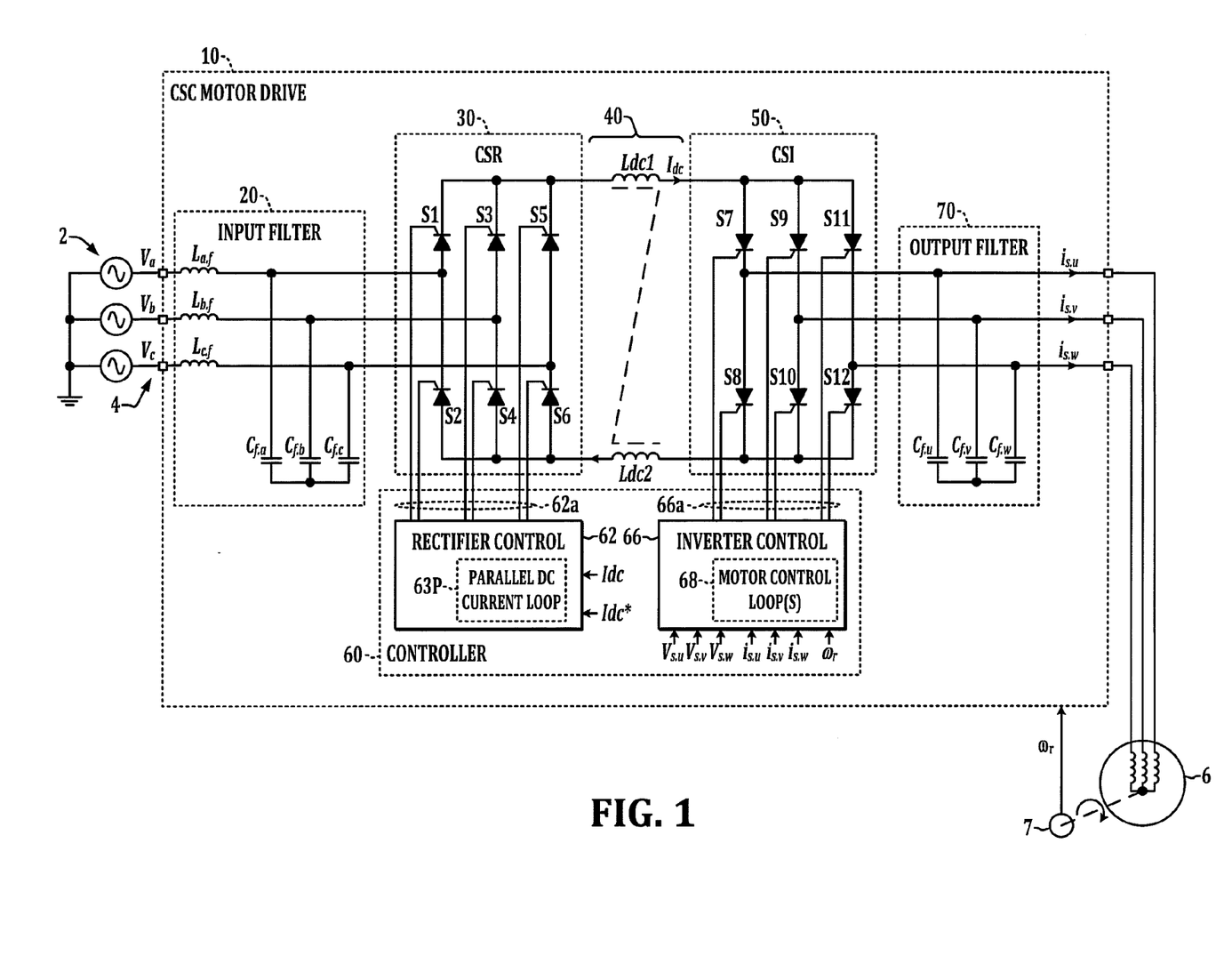
FIG. 1 is a schematic diagram illustrating an exemplary current source converter (CSC) AC motor drive implementing a parallel DC current control loop in accordance with one or more aspects of the present disclosure.

FIG. 1 illustrates an exemplary current source converter (CSC) motor drive 10 with a three-phase AC input 4 receiving input power from a three-phase source 2 providing input voltages $V_a$, $V_b$ and $V_c$. The CSC drive 10 includes a current source rectifier 30 with thyristor switches S1-S6 connected to the source 2 through an LC input filter 20 with line inductors $L_{a,f}$, $L_{b,f}$ and $L_{c,f}$ and Y-connected filter capacitors $C_{f,a}$, $C_{f,b}$ and $C_{f,c}$. The rectifier switches S1-S6 are individually coupled between a corresponding AC input line and one of first and second (e.g., upper and lower) DC current paths connected to an intermediate DC link circuit 40. The DC link circuit 40 provides a DC link choke or inductance Ldc1, Ldc2 for providing a controlled DC link current $I_{dc}$ to DC inputs of a current source inverter 50, which provides variable frequency, variable amplitude AC output current to drive a motor load 6 by operation of inverter switching devices S7-S12. The AC output provided by the current source inverter 50 is provided to a motor load 6 in the illustrated embodiment through an output filter 70 including Y-connected output filter capacitors $C_{f,u}$, $C_{f,v}$ and $C_{f,w}$. The inverter switching devices S7-S12 are operable according to inverter switching control signals 66a to selectively couple a corresponding one of the DC current paths of the intermediate DC circuit 40 with a corresponding AC output node to provide controlled AC output current $i_{s,u}$, $i_{s,v}$, $i_{s,w}$ to drive the motor load 6. Although illustrated and described in the context of motor drive type power conversion systems 10, the various disclosed concepts can be employed in other forms of power conversion systems to drive a motor or other type of load 6. The motor load 6 in this example is connected to a resolver 7 providing a rotor speed feedback signal or value $\omega_r$ for use in controlling the motor drive 10, although other embodiments are possible in which the rotor speed is estimated based on one or more sensed motor drive operating parameters.

As further seen in FIG. 1, the CSC motor drive 10 includes a drive controller 60 implementing a rectifier switching controller 62 providing rectifier switching control signal 62a to the rectifier switches S1-S6 to cause the rectifier 30 to convert received three-phase AC input power to provide a controlled DC link current $I_{dc}$ to the intermediate DC link circuit 40 using any suitable pulse width modulation (PWM) technique. The rectifier controller 62, moreover, provides the control signals 62a according to a parallel DC current control loop 63P. The current source inverter 50 receives DC current from the link circuit 40 and includes inverter switches S7-S12 individually coupled between one of the positive or negative DC link output terminals and a corresponding output phase connected to the motor load 6. The inverter switches S7-S12 are operated according to inverter switching control signals 66a provided by an inverter switching component 66 of the drive controller 60, which generates the signals 66a according to any suitable pulse width modulation technique to convert DC current from the link circuit 40 to provide variable frequency, variable amplitude AC output current to the motor load 6. In addition, as described further below, the inverter controller 66 provides the inverter switching control signal 66a according to one or more motor control loops 68.

The current source rectifier 30 and the current source inverter 50 may employ any suitable form of switching devices S1-S12 including without limitation thyristors, insulated gate bipolar transistors (IGBTs), silicon controlled rectifiers (SCRs), gate turn-off thyristors (GTOs), integrated gate commutated thyristors (IGCTs), etc. As previously mentioned, moreover, the illustrated current source rectifier 30 employs thyristors which are particularly suitable for switching voltages associated with medium voltage motor drives. The controller 60 and its switching control components 62 and 66 may be implemented using any suitable processor-based circuitry, including without limitation one or more processing elements and associated electronic memory operated according to program instructions to implement the various motor control functions set forth herein and other motor control functions as are known.

Figure 7:
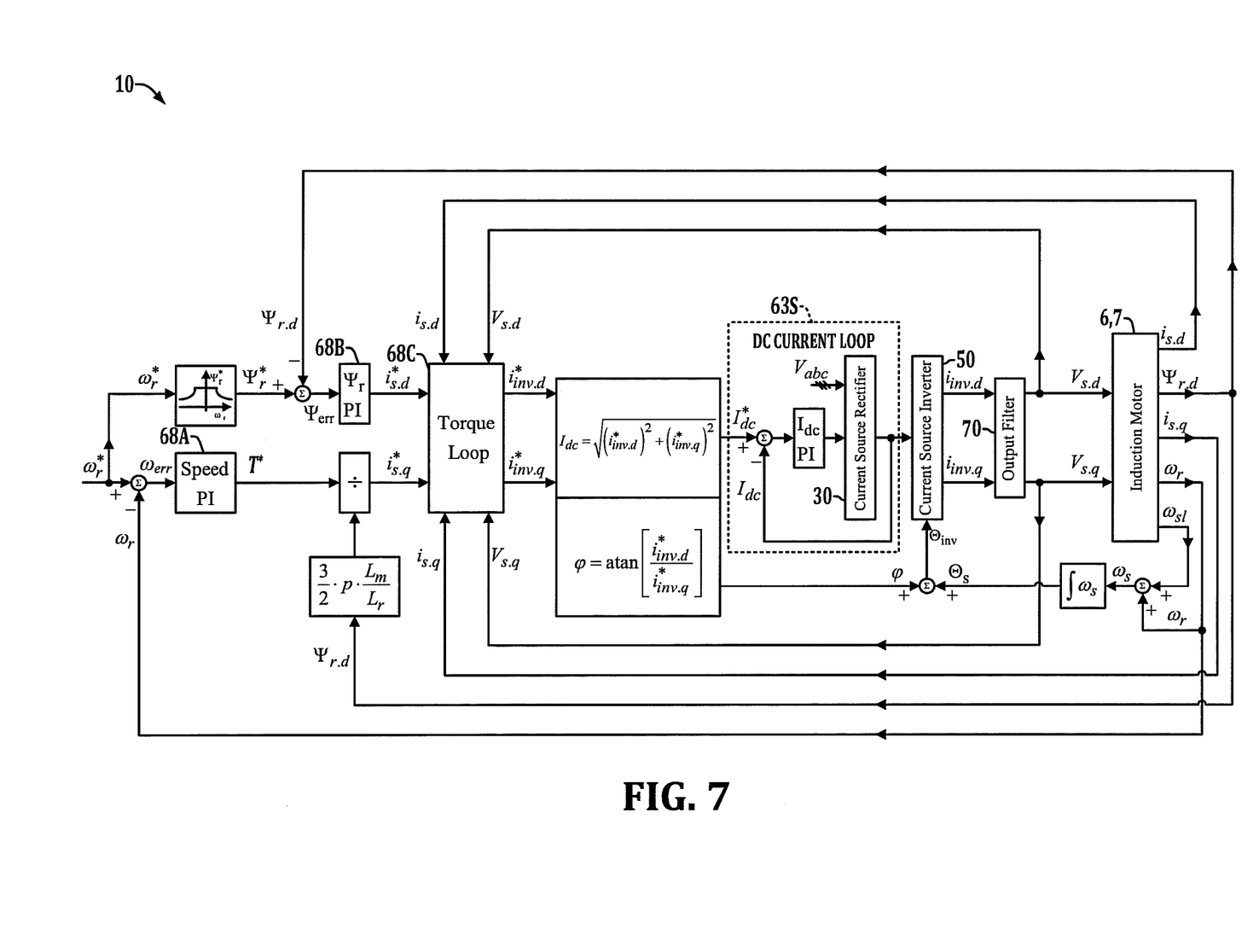
FIG. 7 is a schematic diagram illustrating a nested control loop configuration with a DC current loop as the inter-most loop.

Referring briefly to FIG. 7, a nested multi-loop control configuration is shown for a medium voltage current source converter motor drive, in which a DC current control loop 63S is provided as an inner-most loop. As previously noted, medium voltage AC motor drives utilizing current source converter technology are typically limited to a maximum current source rectifier switching frequency of less than 500 Hz, primarily due to long time constants associated with the DC link choke or inductance and the use of thyristors S1-S6 to withstand the relatively high switching voltages. Field Oriented Control (FOC) approaches employ several loops such as DC current loop 63S connected in series within one or more outlying motor control loops 68, such as a d-q current loop for controlling the inverter currents and possibly a d-q voltage loop, a flux loop 68B, a torque control loop 68C and a speed loop 68A. However, limiting operation of the current source rectifier loop 63S to a relatively low rectifier carrier frequency leads to dynamic limitations on all the outlying control loops 68, thereby limiting the associated crossover frequencies.

Figure 2:
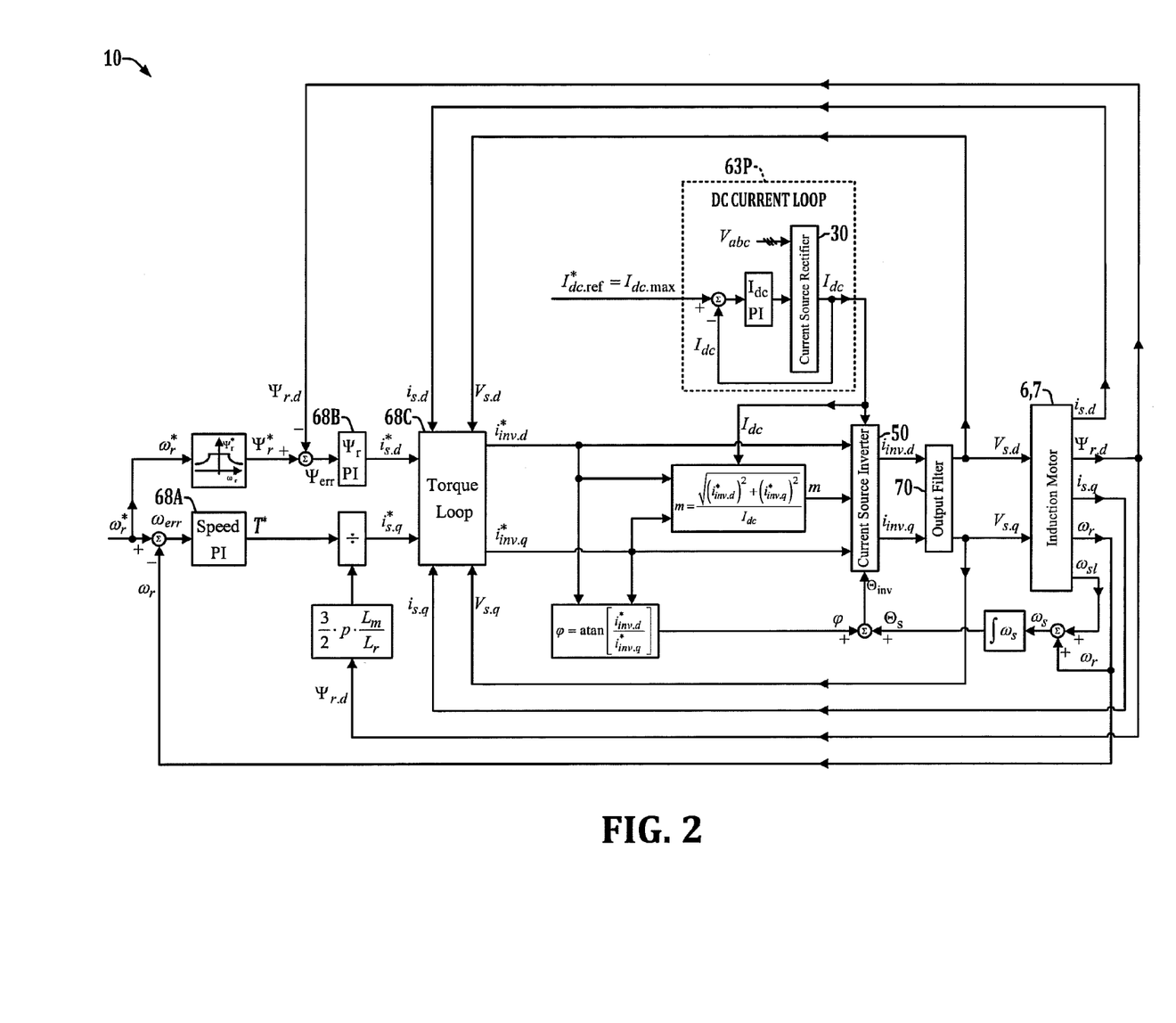
FIG. 2 is a schematic d,q coordinate diagram illustrating details of a first embodiment of a motor drive controller implementing a multi-loop control scheme with a parallel DC current loop controlled independent of the other control loops in accordance with the present disclosure.

Referring now to FIGS. 1 and 2, the present disclosure provides novel current source converter control topologies in which the dynamic performance is improved compared with the approach shown in FIG. 7. In particular, the controller 60 is programmed in various embodiments to implement a multi-loop control scheme for controlling operation of a motor or other load 6 in which the DC current control loop 63P is parallel to one or more motor control loops 68, and operates according to a DC current command signal or value $I^*_{dc.ref}$ derived at least partially independent of the motor command signals or values. In the example of FIG. 2, the controller 60 implements a speed control loop 68A according to a desired rotor speed signal or value $\omega^*_r$, along with a flux control loop 68B according to a desired rotor flux value $\Psi^*$, and a torque control loop 68C operating according to a torque command signal or value $T^*$. Although this example employs three nested control loops 68, a variety of other motor control schemes can be used in which one or more motor control loops 68 are controlled according to a corresponding operating parameter. For instance, control scheme illustrated in FIG. 2 may be modified by removing the flux control loop, with a d-axis stator current command value $I^*_{s.d}$ being set to a fixed value, such as a rated d-axis current amount.

As used herein, control loops are closed-loop computations of command values used for generating switching control signals for a corresponding converter stage, such as the current source rectifier 30 and the current source inverter 50 of FIG. 1. As seen in FIG. 2, for instance, moreover, the control loops 63P and 68 operate according to one or more feedback signals or values which represent internal states and/or operating parameters of the motor drive 10, wherein the feedback signals or values can be obtained by direct measurement of conditions within the drive 10 and/or within a driven load 6, and/or the feedback signals or values can be computed or otherwise derived from measured or estimated signals or values.

The example of FIG. 2 provides an outer speed loop implemented using a speed proportional-integral (PI) control component 68A which receives a speed error signal $\omega_{err}$ as an input, and provides a torque command output signal $T^*$ as shown. The outer rotor speed control loop 68A provides closed loop which is controlled to regulate the rotor speed of the driven motor 60 to a setpoint or speed command value $\omega^*_r$, which can be provided as an input to the CSC motor drive 10 from a user interface or from a connected network or hierarchical control system (not shown). A feedback rotor speed value $\omega_r$ is obtained from the resolver 7 of FIG. 1 in one example, and is subtracted from the speed command value $\omega^*_r$ to obtain the speed error signal $\omega^*_{err}$ to provide the input to the speed PI controller 68A as shown in FIG. 2. In this implementation, moreover, the controller 60 derives a flux command reference signal or value $\Psi^*_r$ according to the speed command value $\omega^*_r$, in this case according to a predefined curve relating the rotor flux and rotor speed. A d-axis feedback flux value $\Psi^*_{r.d}$ (measured or derived) is subtracted from the flux command $\Psi^*_r$ to generate a flux error signal $\Psi_{err}$ used as an input by a flux PI controller 68B to provide a flux control loop which outputs a d-axis motor stator current command or setpoint signal $I_{s.d}$ used as an input by the torque control loop 68C. The flux feedback value $\Psi^*_{r.d}$ is also scaled by $(3/2)*p*(L_m L_r)$ as shown in FIG. 2, representing the number of motor poles and the motor inductance, and a torque command value $T^*$ is divided by the result to provide a q-axis stator current setpoint or command value $I^*_{s.q}$ as another input to the torque control loop 68C. Actual measured or derived values for the motor stator currents and voltages $I_{s.d}$, $I_{s.q}$, $V_{s.s}$ and $V_{s.q}$ are provided (in this example in the d and q-axis reference frame) to the torque loop control component 68C by any suitable signal and/or value sensing or computational techniques. Thus, the current command values from the flux and speed loops 68B and 68A are provided as command inputs to an inner torque control loop 68C. The output of the torque loop is the demanded d and q-axis inverter current values $i^*_{inv.d}$ and $i^*_{inv.q}$. The torque control loop 68C can implement any suitable control computations, such as proportional-integral (PI), proportional-integral-derivative (PID), or other suitable regulating control configurations based on the d and q-axis stator current command values and one or more feedback values to generate the d and q-axis inverter current demand values $i^*_{inv.d}$ and $i^*_{inv.q}$.

The inverter current demand values $i^*_{inv.d}$ and $i^*_{inv.q}$ are then provided as inputs to the current source inverter 50, wherein the inverter control component 66 in FIG. 1 generates the control signal 66a to operate the CSI switches S7-S12 to drive the motor load 6 accordingly. As seen in FIG. 2, therefore, the controller 60 implements the motor control loops 68 to control the speed, torque and flux operating parameters $\omega_r$, $T$ and $\Psi$ of the motor load 6 by providing the inverter switching control signals 66a. The switching operation of the inverter 50 accordingly causes conversion of DC current from the intermediate DC circuit 40 to regulate the AC output current $i_{s.u}$, $i_{s.v}$, $i_{s.w}$ provided to the motor load 6 in a closed-loop fashion according to the corresponding motor command signals or values $\omega^*_r$, $T^*$ and $\Psi^*$. In the example of FIG. 2, the current source inverter control 66 employs space vector modulation to generate pulse width modulated switching control signal 66a according to the inverter current demand values $i^*_{inv.d}$ and $i^*_{inv.q}$ from the control loops 68 and also according to a modulation index "m", where the modulation index m is computed according to a magnitude of the commands $i^*_{inv.d}$ and $i^*_{inv.q}$ scaled by a value of the DC current $I_{dc}$ according to the following equation (1):

$$m = \frac{\sqrt{(i^*_{inv.d})^2 + (i^*_{inv.q})^2}}{I_{dc}} \quad (1)$$

As further shown in FIG. 2, the d and q-axis inverter current values $i^*_{inv.d}$ and $i^*_{inv.q}$ are also used to compute the desired rectifier angle value $\phi$ according to the following equation (2):

$$\varphi = a\tan\left[\frac{i^*_{inv.d}}{i^*_{inv.q}}\right] \quad (2)$$

The rectifier angle value φ is used by the inverter controller 66 to compute the inverter angle input $\theta_{inv}$ based on a stator angle value $\theta_S$ computed as the integral of the sum of the motor slip angle $\omega_{sl}$ and the rotor angle $\omega_r$ received from the resolver 7.

In accordance with one or more aspects of the present disclosure, the controller 60 implements a parallel DC current control loop 63P as shown in FIG. 2, by providing the rectifier signals 62a to the rectifier 30 to selectively convert AC input power to regulate the DC current $I_{dc}$ in a closed-loop fashion according to a DC current command signal or value $I^*_{dc,ref}$ derived at least partially independent of the motor command signals or values $\omega^*_r$, $T^*$ and $\Psi^*$. As seen in FIG. 2, for instance, the DC current command value $I^*_{dc,ref}$ is derived entirely independent from operation of the motor control loops 68. This is in contrast to the control scheme of FIG. 7, in which the DC current command value $I^*_{dc,ref}$ was computed based on the magnitude (e.g., square root of the sum of squares) of the d and q-axis inverter current demand values $i^*_{inv.d}$ and $i^*_{inv.q}$ from the torque controller 68C.

By providing the separate or parallel DC current control loop 63P in FIG. 2, therefore, the switching frequency limitations of the thyristors used in the current source rectifier 30, and any lengthy time constants associated with the DC link choke $L_{dc}1$, $L_{dc}2$ of the intermediate circuit 40 do not operate as dynamic limitations to the operation of the motor control loops 68. As a result, the overall motor drive 10 can be operated by the controller 60 to quickly react to any changes in the load 6, such as increased torque requirements, and/or to step changes in demanded speed, torque or flux. Consequently, the current source rectifier 30 can utilize thyristors or other switching devices S1-S6 that can accommodate high switching voltages, and may use adequate DC link choke inductance values, while achieving higher dynamic performance with respect to controlling the motor load 6 than was possible with the configuration shown in FIG. 7.

In the example of FIG. 2, the controller 60 regulates the DC current $I_{dc}$ provided to the intermediate DC circuit 40 by the current source rectifier 30 in a closed-loop fashion according to a constant DC current command signal or value $I^*_{dc}$, which is entirely independent of the operation of the motor control loops 68. In one possible implementation, the constant DC current command signal or value $I^*_{dc,ref}$ represents a maximum rated DC current $I_{dc,max}$ of the current source rectifier 30. In certain embodiments, moreover, the controller 60 is programmed to allow a user to adjust the constant DC current command signal or value $I^*_{dc,ref}$, for example, via a user interface or connected network (not shown) operatively associated with the motor drive 10.

Figure 3:
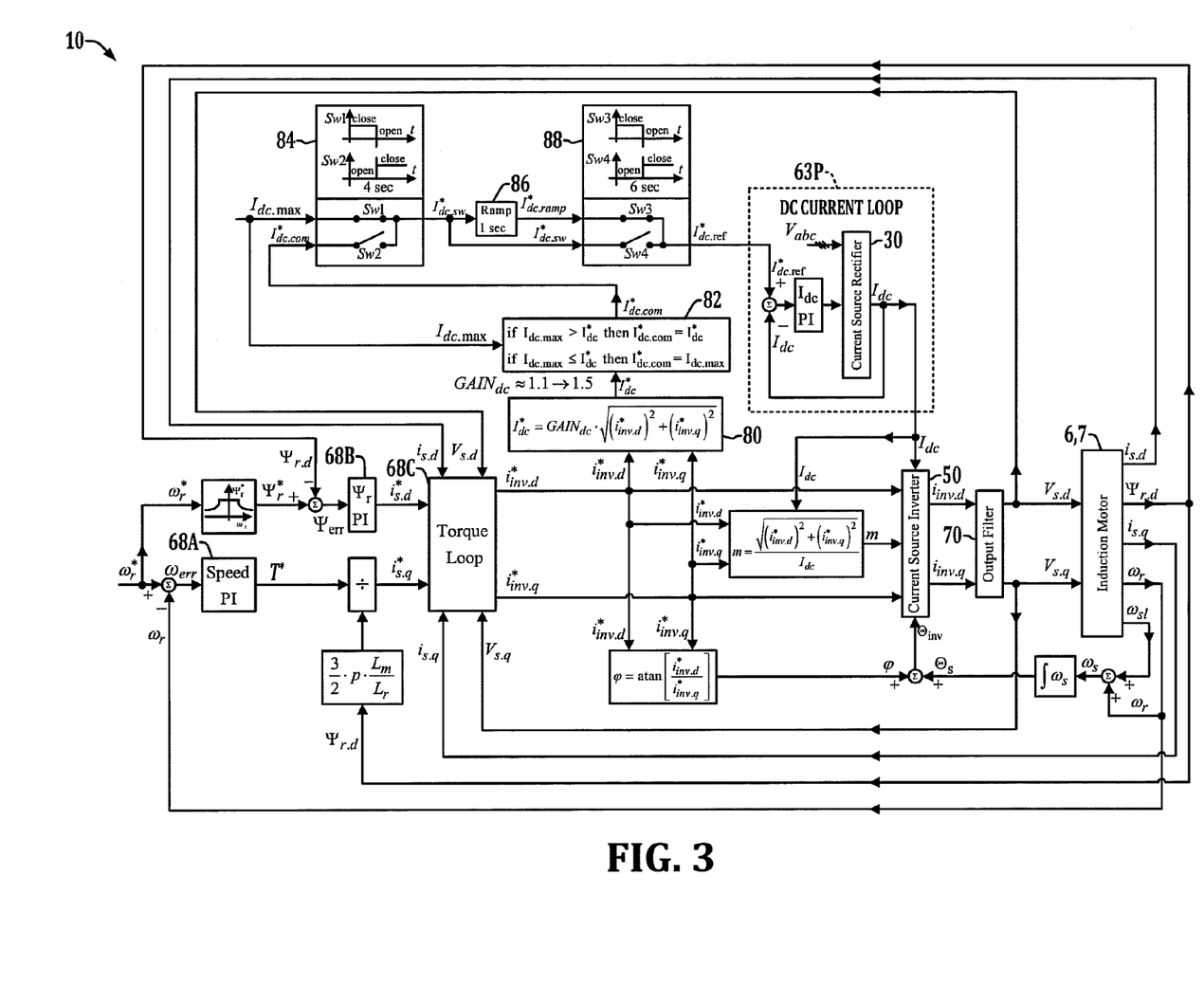
FIG. 3 is a schematic d,q coordinate diagram illustrating details of another motor drive controller embodiment with a parallel DC current loop operated according to a command value computed using a non-unity gain value based on demanded inverter current values.
Figure 4:
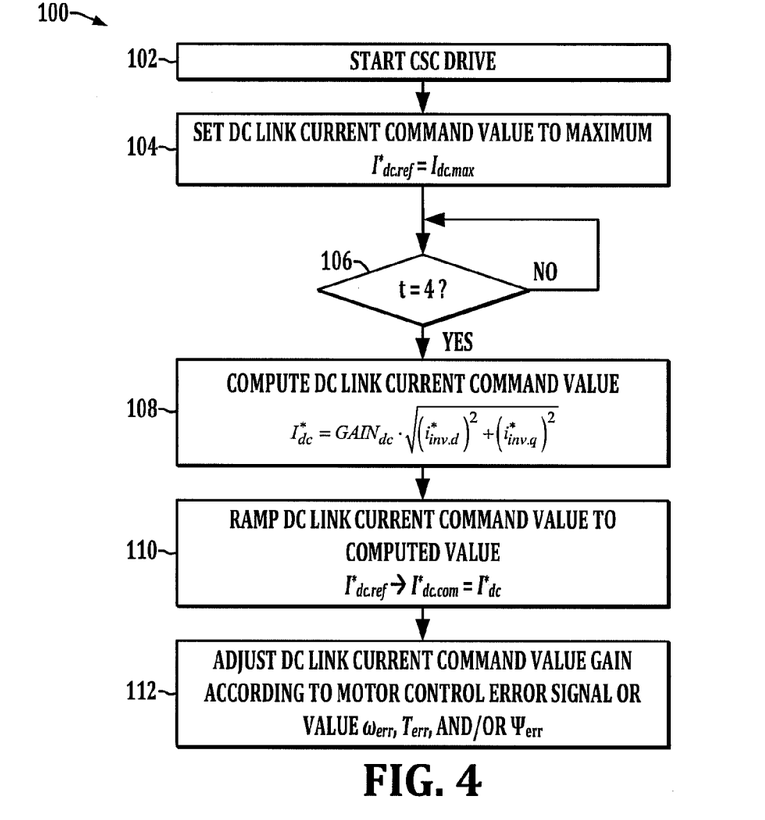
FIG. 4 is a flow diagram illustrating startup operation of the CSC motor drive according to the control configuration of FIG. 3.
Figure 5:
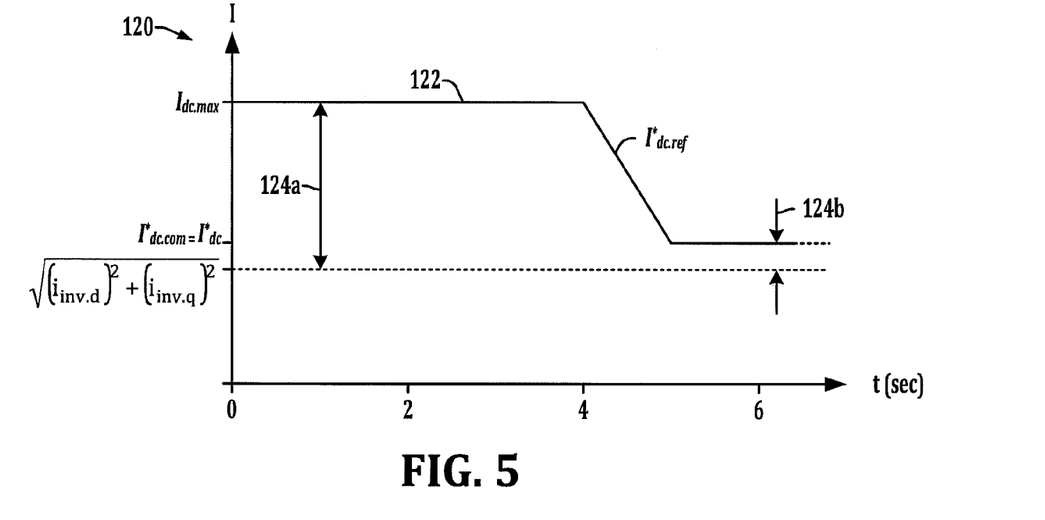
FIG. 5 is a graph illustrating DC current loop reference command value as a function of time during startup of the CSC motor drive of FIGS. 1 and 3.

Referring now to FIGS. 3-5, another embodiment is illustrated in which the controller 60 implements the DC current control loop 63P to provide the rectifier switching control signals 62a in a closed-loop fashion according to a command signal or value $I^*_{dc,ref}$ computed as the product of the magnitude of the d and q-axis inverter current command signals or values $i^*_{inv.d}$ and $i^*_{inv.q}$ from the motor control loops 68 and a gain value $GAIN_{dc}$, wherein the gain value $GAIN_{dc}$ is greater than 1.0. As seen in FIG. 3, for instance, a value $I^*_{dc}$ is computed in a gain component 80 of the controller 60 based on the inverter current commands $i^*_{inv.d}$ and $i^*_{inv.q}$ according to the following equation (3):

$$i_{dc}^* = GAIN_{dc} \cdot \sqrt{(i_{inv.d}^*)^2 + (i_{inv.q}^*)^2}. \quad (3)$$

In the illustrated implementation, moreover, the gain value $GAIN_{dc}$ is in a range from 1.1 to 1.5, although other predefined ranges of the gain value can be used which maintain the gain greater than unity ($GAIN_{dc} > 1.0$). In this manner, the gain value $GAIN_{dc}$ provides a certain margin allowing the motor control loops 68 to dynamically respond to changes in commanded performance and/or load changes, while still ensuring adequate DC link current $I^*_{dc}$ to accommodate the needs of the current source inverter 50 at any given time. It is noted that operation in FIG. 2 with the DC current command value $I^*_{dc,ref}$ set to the maximum rated current or some other relatively high value can result in high switching losses in the current source rectifier 30, whereas the use of the gain factor in the implementation of FIG. 3 limits the inefficiency penalty while still providing dynamic performance improvement compared with the approach of FIG. 7. The gain factor $GAIN_{dc}$ in certain embodiments may be user adjustable.

In the embodiment of FIG. 3, the controller 60 may also employ logic 82 to set a DC current command value $I^*_{dc,com}$ to that obtained using equation (3) unless the computed value would exceed the maximum value $I_{dc,max}$, in which case the controller would limit the command to the maximum value $I_{dc,max}$. As further seen in FIG. 3, the controller 60 initially sets the DC current command signal or value $I^*_{dc,ref}$ to the maximum value $I_{dc,max}$ by determining a value $I_{dc,sw}$ via logic component 84 (shown schematically as switches Sw1 and Sw2 for illustrative purposes only) for a predetermined time (e.g., 4 seconds in one implementation) upon and after power up of the motor drive 10, after which the command $I^*_{dc,ref}$ is computed as the product of the inverter current command signal magnitude (the square root of the sum of squares of the d and q-axis command values $i^*_{inv.d}$ and $i^*_{inv.q}$) and the gain value $GAIN_{dc}$ according to equation (3). The illustrated embodiment of FIG. 3 further includes a ramp function component 86 and further logic 88 which selectively computes the DC current command value $I^*_{dc,ref}$ based on the value $I_{dc,sw}$ such that changes in the value are not abrupt, for example, via a 1 second ramp function 86 for a second predetermined time, such as 6 seconds after power up of the motor drive via the logic 88 which provides switching functions shown as using switches Sw3 and Sw4 for illustrative purposes only.

Referring also to FIGS. 4 and 5, FIG. 4 illustrates an exemplary method or process 100 for controlling a current source converter motor drive 10, which can be implemented in the illustrated controller 60 in certain embodiments. At 102 and FIG. 4, the motor drive 10 is started, and the controller 60 sets the DC link current command value to a maximum value at 104 ($I^*_{dc,ref} = I_{dc,max}$). A determination is made at 106 as to whether 4 seconds have elapsed since the motor drive 10 was powered up, and once this time period has elapsed (YES at 106), the controller 60 computes the DC link current command value $I^*_{dc}$ and 108 based on equation (3) above using the gain value $GAIN_{dc}$ and the inverter current commands $i^*_{inv.d}$ and $i^*_{inv.q}$. At 110, the controller 60 optionally ramps the DC link current command value to the computed value (e.g., via the ramp component 86 and FIG. 3), and the process 100 may also include optionally adjusting the gain value $GAIN_{dc}$ at 112 according to one or more motor control error signals or values as discussed further below in connection with FIG. 6.

FIG. 5 provides a graph 120 illustrating an example curve 122 showing the DC link current command value $I^*_{dc,ref}$ as a function of time after the motor drive 10 is powered up at time t=0. As seen in this example, the current command value 122 is initially set to the maximum value $I_{dc,max}$ upon power up, and is then gradually ramped down to the computed value $I_{dc,com} = I_{dc}$ via the ramp component 86. As seen in the graph 120, the resulting control setpoint or command value $I_{dc.ref}$ 122 maintains a margin 124 above the magnitude of current required by the inverter control 66, where the initial margin 124a is quite significant at startup in order to accommodate potentially large current and/or torque requirements of the motor load 6, and thereafter the margin is reduced to a value 124b commensurate with the gain value $GAIN_{dc}$ in order to provide a controlled amount of available current to accommodate load changes, setpoint changes, etc., while reducing the amount of switching loss penalty in the current source rectifier 30.

Figure 6:
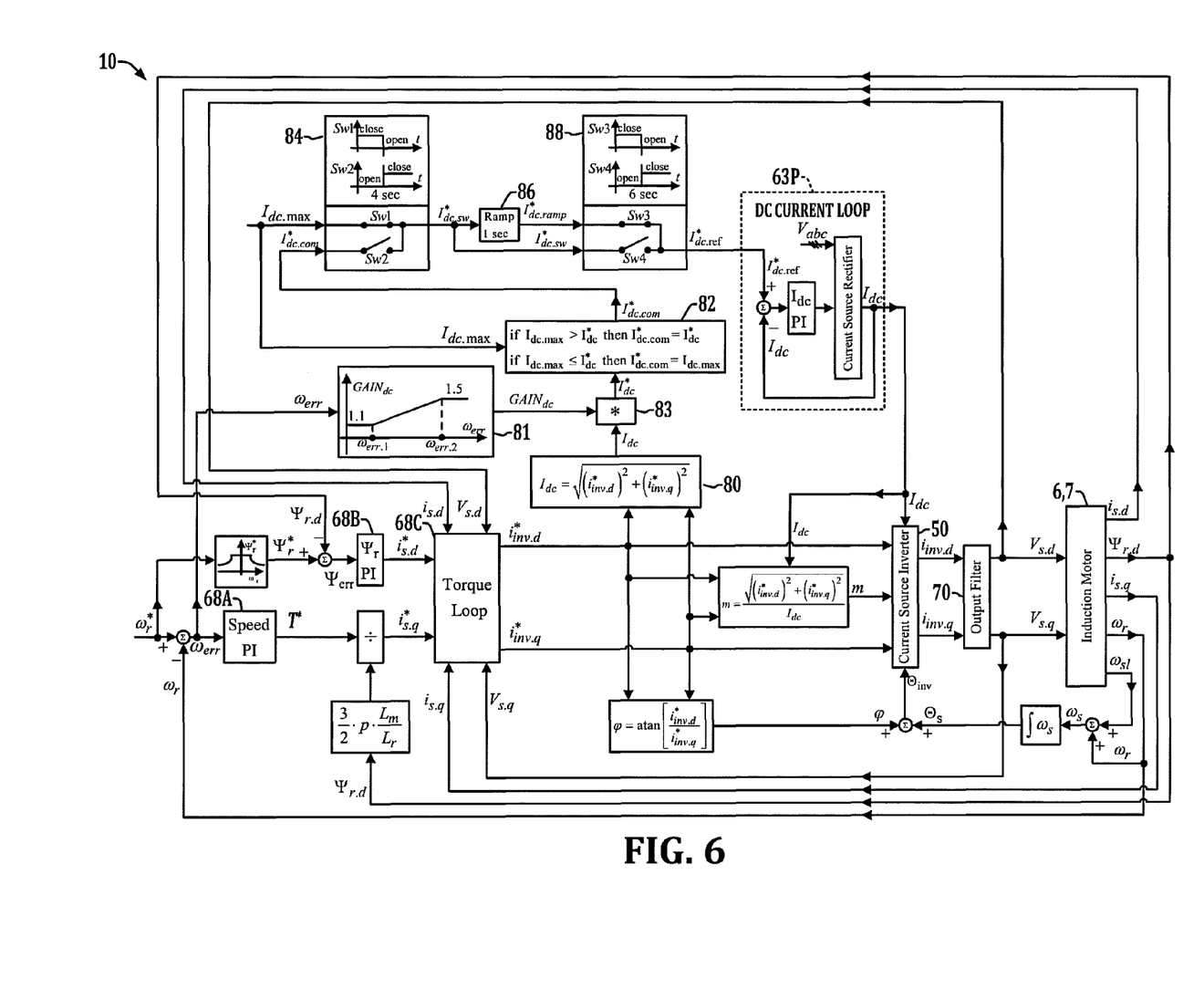
FIG. 6 is a schematic diagram illustrating details of a third motor drive controller embodiment with a parallel DC current loop having an adjustable gain determined according to a speed error value in accordance with the present disclosure.

Referring now to FIG. 6, another possible embodiment is illustrated in which the controller 60 automatically adjusts the gain value $GAIN_{dc}$ according to one or more error signals or values such as the speed error $\omega_{err}$, a torque error $T_{err}$, and/or a flux error $\Psi_{err}$ computed for corresponding motor control loop(s) 68. FIG. 6 shows an example in which the gain value $GAIN_{dc}$ is modified according to a function component 81 based on the rotor speed error signal or value $\omega_{err}$, where the gain adjustment is within a predefined range (e.g., 1.1-1.5 in this case). The resulting computed gain value $GAIN_{dc}$ is multiplied via a multiplier component 83 by the computed current command value $I_{dc}$ (based on the magnitude of the inverter current commands $i^*_{inv.d}$ and $i^*_{inv.q}$) for selective limiting by the logic 82, with the startup logic 84, 86 and 88 as described above in connection with FIG. 3. In this example, moreover, the controller 60 selectively increases the gain value $GAIN_{dc}$ for increases in the error signal or value $\omega_{err}$ and vice versa. In this manner, extra gain (and hence, extra margin for improved dynamic performance) is provided when the error signal is large, and thereafter as the error signal is reduced, the gain (and hence the margin) is reduced within a controlled range (e.g., 1.1-1.5 in this example) such that the motor drive efficiency does not suffer significantly, and the extra gain is provided on an as-needed basis to facilitate improved dynamic performance. Other implementations are possible in which one or more error values (e.g., speed error signal or value $\&_{err}$, torque error signal or value $T_{err}$, flux error signal or value $\Psi_{err}$, etc. and/or combinations thereof) are used to selectively adjust the gain value $GAIN_{dc}$. For example, the gain $GAIN_{dc}$ could be modified automatically according to both speed and torque error or other combinations of error signals or values used in, or computed by, the controller 60.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A motor drive, comprising:
a current source rectifier including a plurality of rectifier switching devices individually operable according to a corresponding one of a plurality of rectifier switching control signals to provide controlled DC current;
an intermediate DC circuit comprising at least one inductance and first and second DC current paths coupled with corresponding first and second DC output nodes of the current source rectifier;
a current source inverter including a plurality of inverter switching devices individually operable according to a corresponding one of a plurality of inverter switching control signals to selectively couple a corresponding one of the first and second DC current paths of the intermediate DC circuit with, a corresponding AC output node to provide controlled AC output current for driving a motor load; and
a controller programmed to implement at least one motor control loop to control at least one operating parameter of the motor load by providing the inverter switching control signals to cause the current source inverter to selectively convert DC current from the intermediate DC circuit to regulate the AC output current provided to the motor load in a closed-loop fashion according to at least one motor command signal or value, the controller being programmed to implement a DC current control loop outside the at least one motor control loop by providing the rectifier switching control signals to cause the current source rectifier to selectively convert AC input power to regulate the DC current provided to the intermediate DC circuit by the current source rectifier in a closed-loop fashion according to at least one DC current command signal or value derived at least partially independent of the at least one motor command signal or value;
wherein the controller is programmed to implement the DC current control loop by providing the rectifier switching control signals upon powerup of the motor drive according to the DC current command signal or value, with the DC current command signal or value set to a maximum rated DC current of the current source rectifier for a predetermined time upon and after power up of the motor drive, and thereafter with the DC current command signal or value computed as a product of a magnitude of at least one inverter current command signal or value from the at least one motor control loop and a gain value, wherein the gain value is greater than 1.0.

2. The motor drive of claim 1, wherein the gain value is from 1.1 to 1.5.

3. The motor drive of claim 2, wherein the controller is programmed to allow a user to adjust the gain value.

4. The motor drive of claim 2, wherein the controller is programmed to automatically adjust the gain value according to at least one error signal or value computed for the at least one motor control loop, with the controller selectively increasing the gain value for increases in the at least one error signal or value, and vice versa.

5. The motor drive of claim 1, wherein the controller is programmed to allow a user to adjust the gain value.

6. The motor drive of claim 1, wherein the controller is programmed to automatically adjust the gain value within a predefined range according to at least one error signal or value computed for the at least one motor control loop, with the controller selectively increasing the gain value within the predefined range for increases in the at least one error signal or value and vice versa.

7. The motor drive of claim 6, wherein the controller is programmed to automatically adjust the gain value within the predefined range at least partially according to a speed error signal or value computed for the at least one motor control loop.

8. The motor drive of claim 7, wherein the controller is programmed to automatically adjust the gain value within the predefined range at least partially according to a torque error signal or value computed for the at least one motor control loop.

9. The motor drive of claim 6, wherein the controller is programmed to automatically adjust the gain value within the predefined range at least partially according to a torque error signal or value computed for the at least one motor control loop.

10. The motor drive of claim 6, wherein the controller is programmed to automatically adjust the gain value within the predefined range at least partially according to a flux error signal or value computed for the at least one motor control loop.

11. A motor drive, comprising:
 a current source rectifier including a plurality of rectifier switching devices individually operable according to a corresponding one of a plurality of rectifier switching control signals to provide controlled DC current;
 an intermediate DC circuit comprising at least one inductance and first and second DC current paths coupled with corresponding first and second DC output nodes of the current source rectifier;
 a current source inverter including a plurality of inverter switching devices individually operable according to a corresponding one of a plurality of inverter switching control signals to selectively couple a corresponding one of the first and second DC current paths of the intermediate DC circuit with a corresponding AC output node to provide controlled AC output current for driving a motor load; and
 a controller programmed to implement at least one motor control loop to control at least one operating parameter of the motor load by providing the inverter switching control signals to cause the current source inverter to selectively convert DC current from the intermediate DC circuit to regulate the AC output current provided to the motor load in a closed-loop fashion according to at least one motor command signal or value, the controller being programmed to implement a DC current control loop outside the at least one motor control loop by providing the rectifier switching control signals to cause the current source rectifier to selectively convert AC input power to regulate the DC current provided to the intermediate DC circuit by the current source rectifier in a closed-loop fashion according to at least one DC current command signal or value derived at least partially independent of the at least one motor command signal or value;
 wherein the controller is programmed to implement the DC current control loop independent from the at least one motor control loop by providing the rectifier switching control signals to cause the current source rectifier to selectively convert AC input power to regulate the DC current provided to the intermediate DC circuit by the current source rectifier in a closed-loop fashion according to a constant DC current command signal or value; and wherein the controller is programmed to provide pulse width modulated inverter switching control signals according to at least one inverter current command signal or value from the at least one motor control loop using a modulation index computed according to a magnitude of the at least one inverter current command signal or value scaled by a value of the DC current.

12. A method for controlling a current source converter having a current source rectifier, a current source inverter driving an AC load, and an intermediate DC circuit, the method comprising:
 using at least one processor, implementing at least one load control loop to control at least one operating parameter of a load by providing inverter switching control signals to cause the current source inverter to selectively convert DC current from the intermediate DC circuit to regulate AC output current provided to the AC load in a closed-loop fashion according to at least one load command signal or value;
 using the at least one processor, computing at least one DC current command signal or value at least partially independent of the at least one load command signal or value; and
 using the at least one processor, implementing a DC current control loop outside the at least one load control loop by providing rectifier switching control signals to cause the current source rectifier to selectively convert AC input power to regulate DC current provided to the intermediate DC circuit in a closed-loop fashion according to the at least one DC current command signal or value;
 wherein the DC current control loop is implemented using the at least one processor by providing the rectifier switching control signals upon powerup of the motor drive according to the DC current command signal or value, with the DC current command signal or value set to a maximum rated DC current of the current source rectifier for a predetermined time upon and after power up of the motor drive, and thereafter with the DC current command signal or value computed as a product of a magnitude of at least one inverter current command signal or value from the at least one motor control loop and a gain value, wherein the gain value is greater than 1.0.

13. A non-transitory computer readable medium with computer executable instructions for controlling a current source converter having a current source rectifier, a current source inverter driving an AC load, and an intermediate DC circuit, the non-transitory computer readable medium comprising computer executable instructions for:
 implementing at least one load control loop to control at least one operating parameter of a load by providing inverter switching control signals to cause the current source inverter to selectively convert DC current from the intermediate DC circuit to regulate AC output current provided to the AC load in a closed-loop fashion according to at least one load command signal or value;
 computing at least one DC current command signal or value at least partially independent of the at least one load command signal or value; and
 implementing a DC current control loop outside to the at least one load control loop by providing rectifier switching control signals to cause the current source rectifier to selectively convert AC input power to regulate DC current provided to the intermediate DC circuit in a closed-loop fashion according to the at least one DC current command signal or value;

wherein the DC current control loop is implemented using the at least one processor by providing the rectifier switching control signals upon powerup of the motor drive according to the DC current command signal or value, with the DC current command signal or value set to a maximum rated DC current of the current source rectifier for a predetermined time upon and after power up of the motor drive, and thereafter with the DC current command signal or value computed as a product of a magnitude of at least one inverter current command signal or value from the at least one motor control loop and a gain value, wherein the gain value is greater than 1.0.

14. The motor drive of claim 1, wherein the controller is programmed to compute the modulation index m according to a magnitude of d and q axis inverter current control commands $i^*_{inv.d}$ and $i^*_{inv.q}$ scaled by a value of the DC current $I_{dc}$ according to the following equation:

$$m = \frac{\sqrt{(i^*_{inv.d})^2 + (i^*_{inv.q})^2}}{I_{dc}}.$$

* * * * *